United States Patent
Kambayashi et al.

(10) Patent No.: US 9,467,281 B2
(45) Date of Patent: *Oct. 11, 2016

(54) INFORMATION PROCESSING APPARATUS AND PROGRAM PRODUCT

(71) Applicant: KABUSHIKI KAISHA TOSHIBA, Minato-ku (JP)

(72) Inventors: Toru Kambayashi, Kanagawa (JP); Yoshikazu Hanatani, Kanagawa (JP); Yuichi Komano, Kanagawa (JP); Yoshihiro Oba, Kanagawa (JP); Satoshi Ito, Tokyo (JP); Taku Kato, Kanagawa (JP); Yasuro Shobatake, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,861

(22) Filed: Apr. 7, 2015

(65) Prior Publication Data
US 2015/0215119 A1 Jul. 30, 2015

Related U.S. Application Data

(63) Continuation of application No. 13/423,410, filed on Mar. 19, 2012, now Pat. No. 9,025,772.

(30) Foreign Application Priority Data

Mar. 31, 2011 (JP) .................................. 2011-077175

(51) Int. Cl.
*H04L 9/08* (2006.01)
*G06F 21/44* (2013.01)
(Continued)

(52) U.S. Cl.
CPC ........... *H04L 9/0819* (2013.01); *G06F 21/445* (2013.01); *H04L 9/0844* (2013.01); *H04L 9/14* (2013.01); *H04L 9/3013* (2013.01); *H04L 2209/24* (2013.01)

(58) Field of Classification Search
CPC combination set(s) only.
See application file for complete search history.

(56) References Cited

U.S. PATENT DOCUMENTS 6,212,279 B1 4/2001 Reiter et al.
6,516,414 B1 2/2003 Zhang et al.
(Continued)

FOREIGN PATENT DOCUMENTS

JP 2001-344214 12/2001
JP 2004-530348 9/2004
(Continued)

OTHER PUBLICATIONS

Menezes et al., "Applied Cryptography", chapter 12 "Key Establishment Protocols", ISBN 0849385237, Oct. 1996.*
(Continued)

*Primary Examiner* — Peter Poltorak
(74) *Attorney, Agent, or Firm* — Oblon, McClelland, Maier & Neustadt, L.L.P

(57) ABSTRACT

According to one embodiment, an information processing apparatus, which is connected to an external apparatus, includes a device key storage unit, a creating unit, a calculating unit, a communication unit, and a key calculating unit. The device key storage unit stores therein a device key. The creating unit creates a media key from the device key and a media key block. The calculating unit calculates first output information on the basis of first inherent information inherent to the information processing apparatus and public information. The communication unit transmits the first output information to the external apparatus and receives second output information calculated by the external apparatus from the external apparatus. The key calculating unit calculates a shared key shared between the information processing apparatus and the external apparatus on the basis of the media key, the first inherent information, and the second output information.

3 Claims, 11 Drawing Sheets

(51) Int. Cl.
*H04L 9/30* (2006.01)
*H04L 9/14* (2006.01)

(56) References Cited

U.S. PATENT DOCUMENTS

| | | |
|---|---|---|
| 6,581,160 B1 | 6/2003 | Harada et al. |
| 6,952,475 B1 | 10/2005 | Horn et al. |
| 7,210,042 B2 | 4/2007 | Kambayashi |
| 7,802,312 B2 | 9/2010 | You et al. |
| 7,958,353 B2 | 6/2011 | Matsuzaki et al. |
| 7,987,361 B2 | 7/2011 | Han et al. |
| 2003/0023847 A1 | 1/2003 | Ishibashi et al. |
| 2003/0105720 A1 | 6/2003 | Ishibashi |
| 2003/0212828 A1 | 11/2003 | Miyazaki et al. |
| 2004/0059925 A1 | 3/2004 | Benhammou et al. |
| 2004/0230800 A1 | 11/2004 | Futa et al. |
| 2007/0283151 A1 | 12/2007 | Nakano et al. |
| 2008/0168276 A1 | 7/2008 | Onoda et al. |
| 2008/0219451 A1 | 9/2008 | Ju et al. |
| 2009/0238362 A1 | 9/2009 | Kitani et al. |
| 2010/0229069 A1 | 9/2010 | Yamaguchi et al. |
| 2012/0250867 A1 | 10/2012 | Kambayashi et al. |

FOREIGN PATENT DOCUMENTS

| | | |
|---|---|---|
| JP | 2006-25298 | 1/2006 |
| JP | 2006-135840 | 5/2006 |
| JP | 2006-529064 | 12/2006 |
| JP | 2008-234089 | 10/2008 |
| JP | 2011-524099 | 8/2011 |
| WO | WO 2004/064314 A1 | 7/2004 |

OTHER PUBLICATIONS

Tseng, "An Efficient Two-Party Identity-Based Key Exchange Protocl", Informatica, 2007, vol. 18, No. 1, 125-136.*
4C Entity, LLC, "Content Protection for Recordable Media Specification, SD Memory Card Book, Common Part", Rev. 0.961, May 3, 2007, 36 Pages.
D. Wallner et al., "RFC 2627—Key Management for Multicast: Issues and Architectures", National Security Agency, Jun. 1999, 18 Pages.
C. Kaufman. Ed., "RFC 4306—Internet Key Exchange (IKEv2) Protocol", © The Internet Society 2005, Dec. 2005, 73 Pages.
Chung Kei Wong et al., "Secure Group Communications Using Key Graphs", ACM SIGCOMM '98, Department of Computer Sciences, The University of Texas at Austin, TR-97-23 Jul. 28, 1997, Nov. 3, 1998 (revised), 28 Pages.
Dalit Naor et al., "Revocation and Tracing Schemes for Stateless Receivers", IBM Almaden Research Center and Applied Math Weizmann Institute, Feb. 24, 2001, 22 Pages.
Japanese Office Action issued Mar. 19, 2013, in Japan Patent Application No. 2011-077175 (with English translation).
M. Baugher et al., "RFC 3547—The Group Domain of Interpretation", © The Internet Society 2003, Jul. 2003, 48 Pages.

* cited by examiner

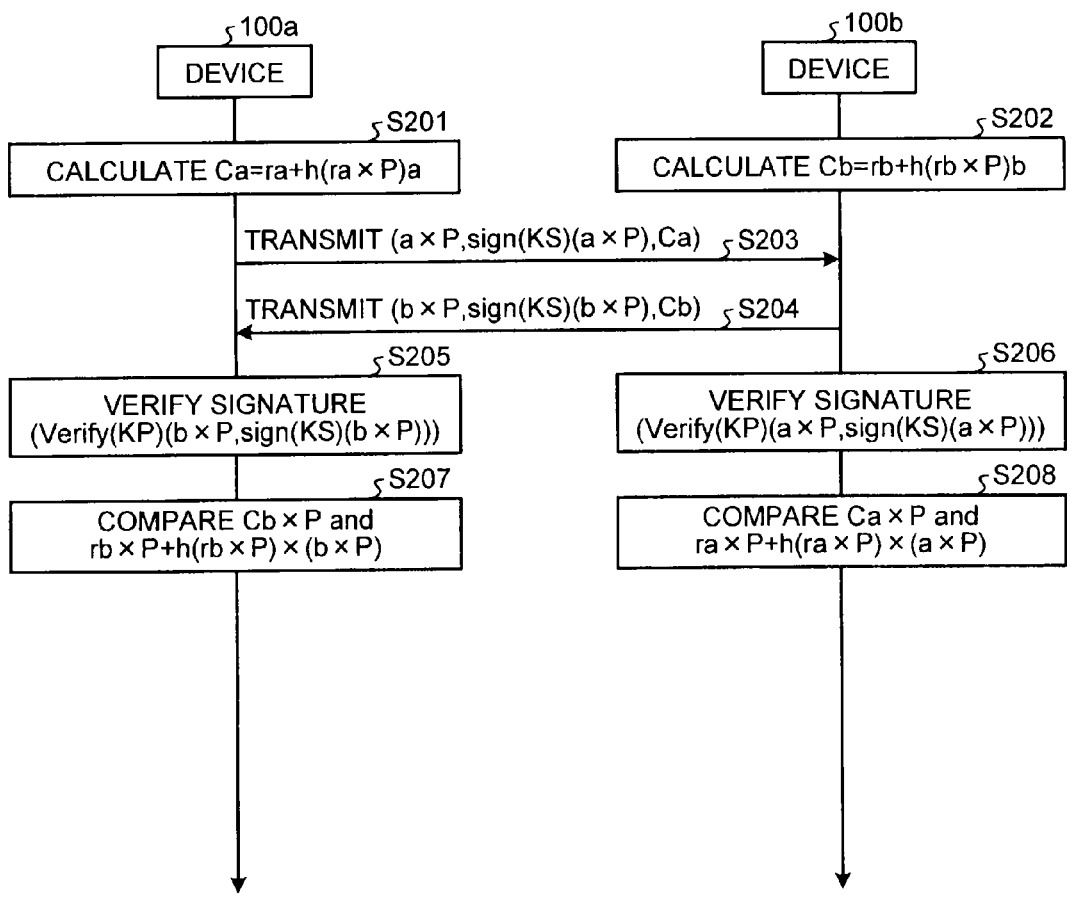

INFORMATION PROCESSING APPARATUS AND PROGRAM PRODUCT

CROSS-REFERENCE TO RELATED APPLICATION

This application is a continuation application of U.S. application Ser. No. 13/423,410, filed on Mar. 19, 2012 (granted on May 5, 2015 as U.S. Pat. No. 9,025,772), and claims the benefit of priority from Japanese Patent Application No. 2011-077175, filed on Mar. 31, 2011. The entire contents of the above-identified applications are incorporated herein by reference.

FIELD

Embodiments described herein relate generally to an information processing apparatus and a program product.

BACKGROUND

Technologies such as the GDOI (Group Domain of Interpretation) and the like are known for sharing encryption keys among plural devices (information processing apparatuses). In the technologies, a key server has encryption keys of respective devices and distributes the encryption keys to the respective devices.

BRIEF DESCRIPTION OF THE DRAWINGS

FIG. 3 is a sequence diagram of a mutual authentication process of the first embodiment;

FIG. 4 is a diagram illustrating an example of a list used for revoking;

DETAILED DESCRIPTION

Figure 1:
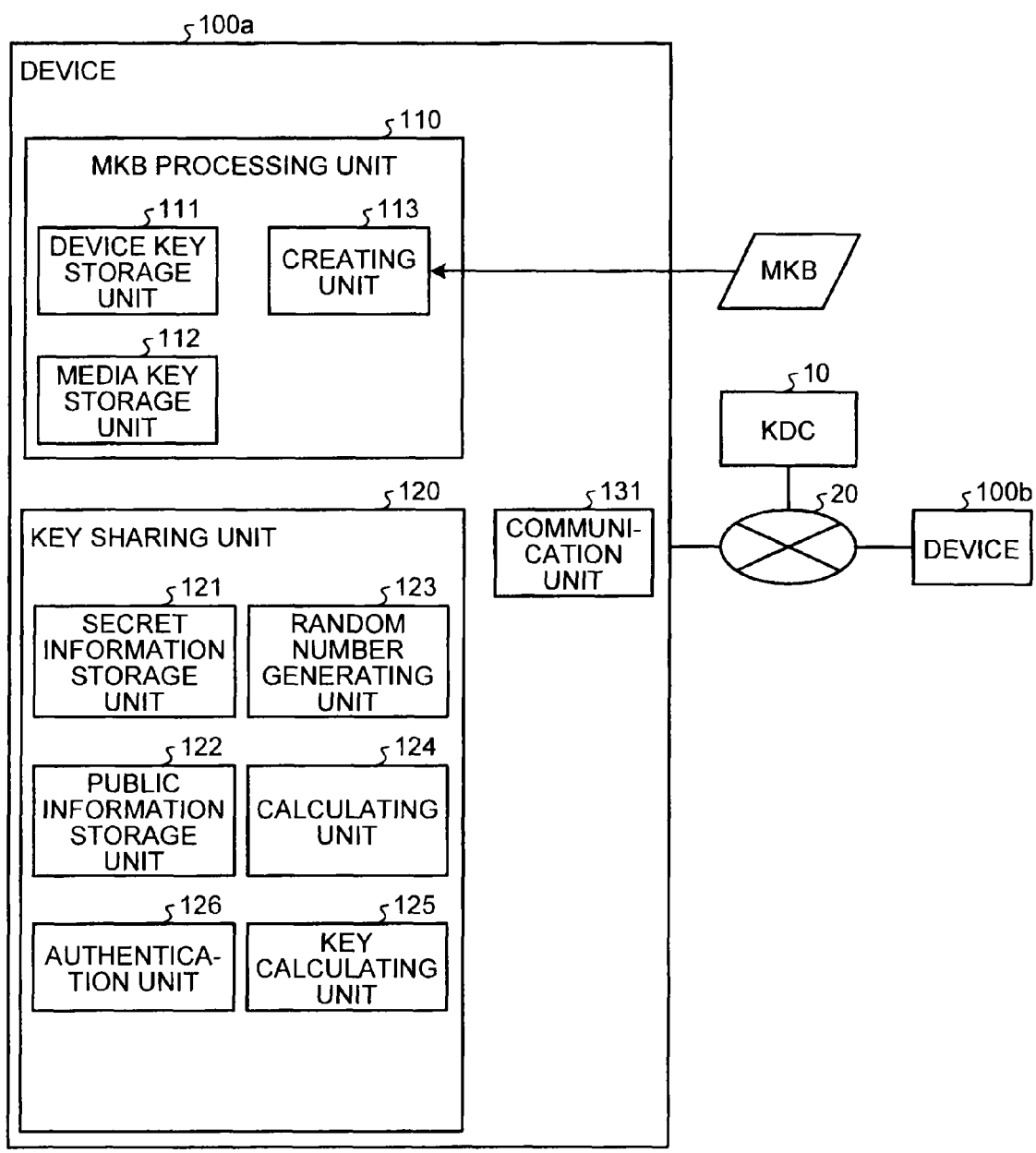
FIG. 1 is a block diagram of a system including an information processing apparatus of a first embodiment.

In general, according to one embodiment, an information processing apparatus, which is connected to an external apparatus, includes a device key storage unit, a creating unit, a calculating unit, a communication unit, and a key calculating unit. The device key storage unit stores therein a device key. The creating unit creates a media key from the device key and a media key block. The calculating unit calculates first output information on the basis of first inherent information inherent to the information processing apparatus and public information. The communication unit transmits the first output information to the external apparatus and receives second output information calculated by the external apparatus from the external apparatus. The key calculating unit calculates a shared key shared between the information processing apparatus and the external apparatus on the basis of the media key, the first inherent information, and the second output information.

Exemplary embodiments of information processing apparatuses will be explained below in detail referring to the accompanying drawings.

First Embodiment

A system including an information processing apparatus according to a first embodiment uses an MKB (media key block) capable of deriving (creating) a media key suitable for calculating a shared key by a predetermined key sharing system. The MKB is distributed to devices from a key distribution center (KDC). Each of the devices creates, from the MKB and its own device key, a media key and calculates a shared key shared among the device and other devices (external apparatuses) using the created media key by the key sharing system. The MKB, an MKB process, an MKB creation, and the like are technologies well-known to a person skilled in the art. The technologies are disclosed in, for example, the following known documents and the detailed explanations thereof are omitted in this specification.

Reference document 1: D. Wallner, E. Harder, R. Agee. "RFC2627, Key Management for Multicast: Issues and Architectures" [online], June 1999, retrieved from the Internet: <URL: http://www.ietf.org/rfc/rfc2627.txt>

Reference document 2: Wong, C., Gouda, M. and S. Lam, "Secure Group Communications Using Key Graphs", Technical Report TR 97-23, Department of Computer Sciences, The University of Texas at Austin, Jul. 28, 1997

Reference document 3: D. Naor, M. Naor and J. Lotspiech, "Revocation and Tracing Schemes for Stateless Receivers", Proc. CRYPTO 2001, LNCS 2139, Springer-Verlag, pp.41-62, 2001

Reference document 4: U.S. Pat. No. 7,210,042

In the system, it is not necessary to distribute encryption keys from a key server to respective devices as in conventional technologies, and it is sufficient for a KDC to only distribute an MKB common to the respective devices. In revoking a certain device, it is sufficient for the KDC to only distribute an updated common MKB to revoke the device. That is, it is only necessary that the KDC distributes the MKB to share keys among the respective devices, and at the same time, a device can be revoked easily.

FIG. 1 is a block diagram illustrating an example of a configuration of a system including an information processing apparatus according to the first embodiment. As illustrated in FIG. 1, the system is configured such that devices 100a, 100b and a KDC 10 are connected via a network 20. The network 20 may be any network, such as the Internet and the like.

Since the devices 100a, 100b have the same configuration, when it is not necessary to discriminate the devices 100a, 100b, they are simply called devices 100. The devices 100 are not limited to the two devices and three or more devices 100 may be provided.

The KDC 10 performs creation of a media key, creation of an MKB, distribution of the MKB, and the like. Public information is information that is made public (information that is not made secret). For example, as the public information, a certain elliptic curve, a base point P on an elliptic curve, and a public key KP for verifying signature are given. The KDC 10 stores therein a secret key KS as secret information known only by the KDC 10, which corresponds to the public key KP for signature. The KDC 10 further has all the device key information in the MKB system and can create the MKB. Any method such as CS (Complete Subtree) system, SD (Subset Difference) system, and the like can be applied as a method of creating the MKB. At least one device key is allocated to each of the devices 100. The KDC 10 gives a point x×P of an elliptic curve as a media key of the MKB. P is a base point on the elliptic curve, and x is an integer selected by the KDC 10. x×P is a point x times the point P on the elliptic curve. The integer x is a secret known only by the KDC 10. When P and Q are points on the elliptic curve, P+Q is a point added the point P and the point Q on the elliptic curve. When x and y are integers, x+y is an integer added x and y, x×y is an integer multiplied x by y.

After the MKB is received, the respective devices 100 process the MKB by device keys allocated to the devices 100 and obtain media keys. When a device 100 is revoked by the MKB, the device 100 cannot properly process the MKB and cannot properly obtain the media key.

The respective devices 100 store therein public IDs of the devices 100. The public ID is a point integer times the base point P in the elliptic curve. The public ID of each device 100 can be represented as i×P. Here, i is an integer. The integer i may be called a secret ID of each device 100. Furthermore, each device 100 may store therein a signature sign(KS)(i×P) that corresponds to the public ID. The signature is signed by the secret key KS stored in the KDC 10. Hereinafter, each device 100 may be represented by the public ID of the device. For example, a device 100 having i×P as the public ID may be called a device i×P.

The device 100 includes an MKB processing unit 110, a key sharing unit 120, and a communication unit 131.

The MKB processing unit 110 accommodates (stores) the device key of the device 100. For example, the MKB processing unit 110 of the device i×P reads an MKB being distributed. When the device key of the device i×P is not revoked, the MKB processing unit 110 can create a media key x×P from the MKB. The MKB processing unit 110 sends the created media key x×P to the key sharing unit 120.

The key sharing unit 120 creates a shared key K shared between the device i×P and a device b×P using the media key. The key sharing unit 120 stores therein the shared key K and sends the shared key K to the communication unit 131 when necessary. The communication unit 131 performs a cipher communication between the device i×P and the device b×P on the basis of the shared key K.

The MKB processing unit 110 may store the public key KP and may confirm the signature of the MKB to prevent forgery of the MKB. Furthermore, the MKB processing unit 110 may send a version number of the MKB to the key sharing unit 120. The version number of the MKB is data having an order accompanying with the MKB. Before the key sharing unit 120 performs a key sharing operation together with the device b×P, the key sharing unit 120 may exchange the version number. In this case, the key sharing unit 120 does not exchange a key with a partner having an old version. Furthermore, the key sharing unit 120 may exchange data with the device b×P and may confirm that the key is shared with the device b×P.

Next, a detailed configuration example of the MKB processing unit 110 will be explained. The MKB processing unit 110 includes a device key storage unit 111, a media key storage unit 112, and a creating unit 113.

The device key storage unit 111 stores a device key allocated to the device 100. The creating unit 113 reads the MKB, processes the MKB by the device key stored in the device key storage unit 111, and creates a media key x×P. The media key storage unit 112 stores the media key x×P created by the creating unit 113. The media key storage unit 112 sends the media key x×P to the key sharing unit 120 in response to a request from the key sharing unit 120.

Next, a detailed configuration example of the key sharing unit 120 will be explained. The key sharing unit 120 includes a secret information storage unit 121, a public information storage unit 122, a random number generating unit 123, a calculating unit 124, a key calculating unit 125, and an authentication unit 126.

The public information storage unit 122 stores a public key KP, a base point P on an elliptic curve, the hash function H, i×P as the public ID of the device 100, and a signature sign(KS)(i×P).

The secret information storage unit 121 stores an integer i as a secret ID of the device 100. Furthermore, the secret information storage unit 121 stores the shared key K as a result of calculation by the key calculating unit 125. The secret information storage unit 121 sends the shared key K to the communication unit 131 in response to a request of the communication unit 131. The communication unit 131 transmits and receives various information to and from another device (for example, the device b×P).

The calculating unit 124 calculates information (first output information) used to exchange a key from information (first inherent information) inherent to the own device and public information. For example, the calculating unit 124 uses a base point P of an elliptic curve as the public information and calculates the first output information by a calculation method, with which the first inherent information is intractable (difficult) to find from the first output information using a difficulty of a discrete logarithm problem as a basis. An integer times a point calculation on an elliptic curve, a power calculation on a multiplicative cyclic group, and the like can be applied as the calculation method using the difficulty of the discrete logarithm problem as the basis of security. An example using the calculation on an elliptic curve will be mainly explained below.

The key calculating unit 125 calculates a shared key shared with an external apparatus from the media key x×P, the information inherent to the own device (the first inherent information), and second output information transmitted from another device 100 (hereinafter, called the external apparatus) to be communicated. The second output information is information calculated by the external apparatus from the information (second inherent information) inherent to the external apparatus by the same calculation method as the calculating unit 124.

The random number generating unit 123 generates a random number in response to an instruction from, for example, the calculating unit 124. The authentication unit 126 performs a mutual authentication process between the device and a communication partner.

An outline of a process when the key calculating unit 125 of the device 100a (also called a device a×P) calculates the shared key K shared between the device 100a and the device 100b (also called the device b×P) will be explained below.

First, the calculating unit 124 reads the base point P from the public information storage unit 122. The calculating unit 124 instructs the random number generating unit 123 to generate a random number and obtains the generated random number ra. The calculating unit 124 uses the random number ra as the first inherent information. Note that the first inherent information is not limited to the random number and may be any information as long as it is information inherent to the device 100.

The calculating unit 124 calculates ra×P and sends the ra×P to the communication unit 131. The communication unit 131 sends the ra×P to the device b×P. The communication unit 131 receives rb×P from the device b×P. The communication unit 131 sends the received rb×P to the key calculating unit 125. The key calculating unit 125 receives the media key x×P from the MKB processing unit 110. The key calculating unit 125 reads the hash function H from the public information storage unit 122. The key calculating unit 125 calculates a shared key K=H(x×P+ra×(rb×P)). The key calculating unit 125 stores the shared key K in the secret information storage unit 121.

Note that the calculation used to calculate the shared key is not limited to the hash function H. Any calculation can be applied as long as the shared key is calculated using the media key x×P, the information (first inherent information) inherent to the own device, and the information (second inherent information) inherent to the device of a communication partner. For example, one-way function other than the hash function may be used. When the one-way function is used, even if a shared key is illegally distributed, it is difficult to presume the data used to calculate the shared key.

Although an example of the hash function H for calculating the shared key by inputting a variable (x×P+ra×(rb×P)) is explained in the above example, a function for calculating the shared key by inputting two or more variables may be used.

The data derived from the MKB as the media key is not limited to x×P. The data may be a numerical value X. In this case, the shared key K can be calculated by, for example, K=G(ra×(rb×P),X) or K=G(X,ra×(rb×P)) and the like. Here, G is the one-way function.

Note that the storage units (the device key storage unit 111, the media key storage unit 112, the secret information storage unit 121, and the public information storage unit 122) can be composed of any ordinary used storage medium such as an HDD (Hard Disk Drive), an optical disc, a memory card, a RAM (Random Access Memory), and the like.

Figure 2:
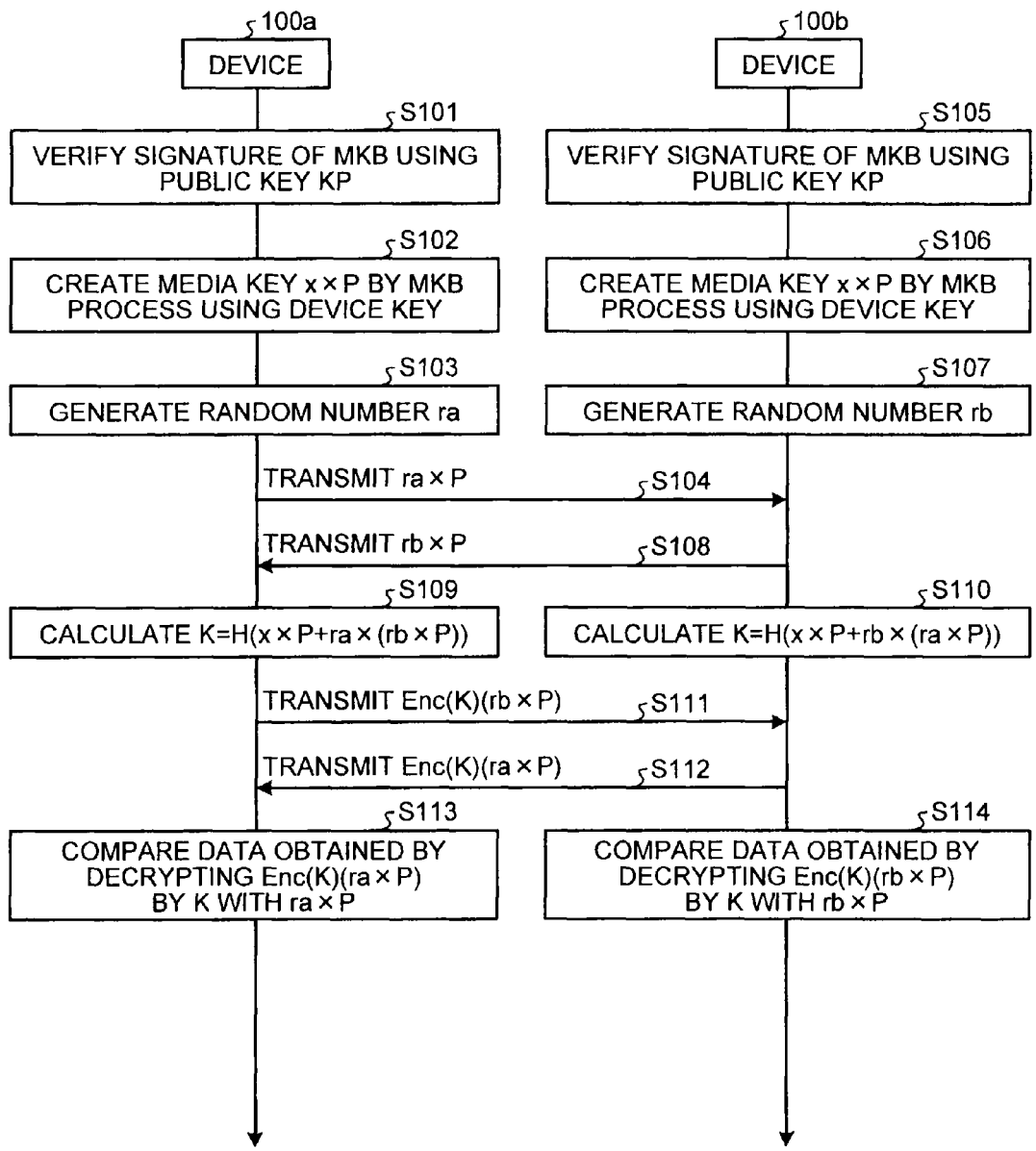
FIG. 2 is a sequence diagram of a key sharing process of the first embodiment.

Next, a key sharing process performed by the device 100 according to the first embodiment configured as described above will be explained with reference to FIG. 2. FIG. 2 is a sequence diagram illustrating an overall flow of the key sharing process in the first embodiment. Hereinafter, a case that shared keys shared between the device a×P and the device b×P are created will be explained as an example.

First, the MKB processing unit 110 of the device a×P verifies a signature of the MKB using the public key KP (step S101). When the signature is not verified, the process ends.

The creating unit 113 of the device a×P processes the MKB using the device key stored in the device key storage unit 111 and creates the media key xP (step S102). When the MKB process cannot be performed because the device a×P is revoked, the process ends.

The random number generating unit 123 of the device a×P generates the random number ra. The device a×P stores the random number ra in, for example, the secret information storage unit 121. The calculating unit 124 of the key sharing unit 120 calculates ra×P from the random number ra and P (step S103). The communication unit 131 transmits the ra×P to the device b×P (step S104).

The device b×P performs verification of a signature of the MKB (step S105), creation of the media key x×P (step S106), generation of the random number rb (step S107), and transmission of rb×P (step S108) by the same process from step S101 to step S104.

The device a×P and the device b×P store received rb×P and ra×P in, for example, the secret information storage units 121, respectively.

The key calculating unit 125 of the device a×P calculates K=H(x×P+ra×(rb×P)) (step S109). The key calculating unit 125 of the device b×P calculates K=H(x×P+rb×(ra×P)) (step S110).

As described above, the shared keys K shared between the device a×P and the device b×P are calculated, respectively. An example of a process for confirming the shared keys will be explained below.

The device a×P transmits Enc(K)(rb×P) to the device b×P (step S111). In contrast, the device b×P transmits Enc(K)(ra×P) to the device a×P (step S112). For example, Enc(K)(rb×P) shows data obtained by encrypting rb×P by the shared key K.

The device a×P decrypts Enc(K)(ra×P) received from the device b×P by the shared key K and compares the obtained data with ra×P and confirms whether they agree with each other (step S113). When they do not agree with each other, the process ends. The device b×P also performs the same process (step S114).

H is a public hash function. Since H(x×P+rb×(ra×P)) agrees with the shared key K, the device a×P and the device b×P can share the shared keys K by the above process. The steps from step S111 to step S114 are an example of a procedure by which the respective devices confirm that the shared keys K are shared, and the procedure is not limited to the method described above.

In the above-described protocol, when both of the device a×P and the device b×P can properly process the MKB, the shared keys K can be shared. The fact that the MKBs are properly processed means that the devices are not revoked. A device which is not revoked may be called a compliant device. The above-described protocol provides a system for permitting compliant devices to share keys. In the latter half of the protocol, a Diffie-Hellman key sharing system is used. A feature of the protocol resides in that when shared keys are created, the media key called x×P is used.

Note that an applicable key sharing system is not limited to the Diffie-Hellman system. Other systems which use the difficulty of the discrete logarithm problem as the basis of security likewise the Diffie-Hellman system may be applied.

It is the KDC 10 that creates the MKB processed by the protocol. The KDC 10 selects a secret integer x, creates an MKB including revoke information, and sets x×P as the media key. Furthermore, the KDC 10 signs the created MKB by the secret key KS. As described above, the KDC 10 creates the MKB using the data which acts as a base for performing a Diffie-Hellman key exchange among the devices as the media key.

Next, an example of a process when mutual authentication is performed between devices will be explained. At the time the key sharing process is finished, the shared keys K are shared between the device a×P and the device b×P, and the device a×P and the device b×P are aware that their partners are compliant devices, respectively. It is sufficient to perform a cipher communication between the compliant devices to share the keys by the protocol. However, when the device a×P and the device b×P perform a communication with each other after they confirm (authenticate) their partners, an authentication protocol must be further performed.

FIG. 3 is a sequence diagram illustrating an overall flow of a mutual authentication process in the first embodiment. Hereinafter, the mutual authentication process between the device 100a (the device a×P) and the device 100b (the device b×P) will be explained as an example.

The authentication unit 126 of the device a×P calculates Ca=ra+h(ra×P)a (step S201). The authentication unit 126 of the device b×P calculates Cb=rb+h(rb×P)b (step S202). Here, h is the public hash function.

The authentication unit 126 of the device a×P transmits data (a×P,sign(KS)(a×P),Ca) to the device b×P (step S203). In contrast, the authentication unit 126 of the device b×P transmits data (b×P,sign(KS)(b×P),Cb) to the device a×P (step S204).

The authentication unit 126 of the device a×P verifies a received signature using the public key KP (step S205). The device a×P verifies the signature by Verify(KP) (b×P,sign (KS)(b×P)) which is a signature verifying algorithm given from, for example, the KDC 10.

When the authentication unit 126 of the device a×P cannot verify the signature, the authentication unit 126 ends the process. The authentication unit 126 of the device b×P also performs the same process (step S206).

The authentication unit 126 of the device a×P calculates Cb×P and compares its value with the value of rb×P+h(rb× P)×(b×P) (step S207). When the values agree with each other, it can be confirmed that a communication partner is surely the device b×P. The authentication unit 126 of the device b×P also performs the same process (step S208).

Although only the public ID of the communication partner device is signature-verified above, the device key number of the communication partner device may be included for signature-verification. Device key numbers are numbers allocated to the device keys without overlaps. When, for example, an MKB having a tree structure is used, numerical values called leaf numbers that are naturally allocated to device keys may be used as device numbers. The device a×P and the device b×P have a signature sign(KS) (a×P∥m), sign(KS) (b×P∥j), respectively. Here, the symbol ∥ shows to couple data. Furthermore, m and j are device key numbers of the device a×P and the device b×P, respectively. It is assumed that the signatures are previously issued by the KDC 10 and distributed to the respective devices. To verify the signature, the device a×P and the device b×P send m and j to each other.

With the inclusion of the device key number for the signature-verification, the device key number of the communication partner device can be surely confirmed. This will be useful in the following case.

It is assumed that a system manager is aware that the contents of cipher communications performed by some devices leak outside. For example, the contents of a cipher communication from the device a×P to the device b×P leak. The device a×P is checked, and no abnormality is found in the device a×P. In contrast, the device b×P is missing and cannot be checked. Moreover, it is found that the device b×P is connected to a network some times and performs cipher communications with many devices other than the device a×P. The system manager decides to revoke the device b×P and to disconnect it from a cipher communication network.

The system manager checks the communication record of the device a×P and obtains the device key number of the device b×P. As described above, since the device key number is signature-verified, it is surely the device key number of the device b×P. Thus, the system manager causes the KDC 10 to create an MKB in which the device key of the obtained device key number is revoked. The device b×P is revoked by distributing the newly created MKB and it becomes impossible for the device b×P to participate in the cipher communication network thereafter.

To revoke illegal equipment and the like, the KDC 10 may have a list composed of device key numbers and device public IDs. FIG. 4 is a diagram illustrating an example of a data structure of the list. In FIG. 4, a1, a2, . . . , aN, . . . are integers. For example, a1P is a point a1 times the base point P.

The KDC 10 can find the device key number of the device from the public ID of the device using the list and thus can find the device key of the device. The list is used, for example, as described below.

For the system manager to revoke the device b×P and to eliminate it from the cipher communication network, the list as illustrated in FIG. 4 which the KDC 10 has is searched and a device key number which corresponds to the public ID (b×P) is obtained. The system manager causes the KDC 10 to create the MKB in which the device key of the obtained device key number is revoked. The device b×P is revoked by distributing the newly created MKB and it becomes impossible for the device b×P to participate in the cipher communication network thereafter.

Next, a case in which three or more compliant devices share keys will be explained. Hereinafter, an example of a key sharing process performed between four devices a1×P, a2×P, a3×P, a4×P will be explained ((A1)-(A7)). The secret IDs of the respective devices are a1, a2, a3, a4. An intermediary device b×P is provided in addition to the devices.

(A1) Signature verification: The devices a1×P, . . . , a4×P verify the signatures of MKBs using public keys KP, respectively. When a signature cannot be verified by any of the devices, the process ends.

(A2) MKB process: The devices a1×P, . . . , a4×P process the MKBs using the device keys thereof. When any of the devices cannot process an MKB because the device is revoked, the process ends.

(A3) The devices a1×P, . . . , a4×P obtain media keys x by the MKB process, respectively.

(A4) The devices a1×P, . . . , a4×P generate random numbers r1, . . . , r4, respectively. The respective devices store the random numbers generated by the devices.

(A5) The devices a1×P, . . . , a4×P send r1×P, . . . , r4×P to the device b×P, respectively. The device b×P calculates r1×P+ . . . +r4×P=(r1+ . . . +r4)×P.

(A6) The device b×P sends (r1+ . . . +r4)×P to a1×P, . . . , a4×P.

(A7) The device a1×P calculates K=H(x×((r1+r2+r3+r4)× P)). The devices a2×P, a3×P, a4×P perform the same calculation. With the operations, the same shared keys K can be obtained.

In the protocols ((A1)-(A7)), when all of the devices a1×P, . . . , a4×P can properly process the MKB, the shared keys K can be shared. Accordingly, the protocols provide a system for permitting the three or more compliant devices to share keys.

Modification

In the embodiment, although a Diffie-Hellman key shearing is performed using the calculation of the elliptic curve, the Diffie-Hellman key shearing can also be performed using other calculations. A modification to which a Diffie-Hellman key sharing system using a power calculation is applied will be explained ((B1)-(B8)).

As public information, a sufficiently large prime number p and an element g of a p finite field are known. The public ID of a device is g^a, and the secret ID is a. Here, g^a represents g to the a power. A KDC 10 sets an integer x as the media key of an MKB. Hereinafter, devices 100 having public IDs $g\hat{a}$ and $g\hat{b}$ are called a device $g\hat{a}$ and a device $g\hat{b}$, respectively.

(B1) Signature verification: The device $g\hat{a}$ and the device $g\hat{b}$ verify the signatures of MKBs using public keys KP, respectively. When any of the devices cannot verify a signature, the process ends.

(B2) MKB process: The device $g\hat{a}$ and the device $g\hat{b}$ process the MKBs using device keys, respectively. When any of the devices cannot process an MKB because the device is revoked, the process ends.

(B3) The device $g\hat{a}$ and the device $g\hat{b}$ obtain media keys x by the MKB process, respectively.

(B4) The device $g\hat{a}$ generates a random number ra, and the device $g\hat{b}$ generates a random number rb. The device $g\hat{a}$ stores ra, and the device $g\hat{b}$ stores rb.

(B5) The device $g\hat{a}$ transmits $g\hat{r}a$ to the device $g\hat{b}$. The device $g\hat{b}$ transmits $g\hat{r}b$ to the device $g\hat{a}$. The device $g\hat{a}$ stores the received $g\hat{r}b$, and the device $g\hat{b}$ stores the received $g\hat{r}a$.

(B6) The device $g\hat{a}$ calculates $K=H (g\hat{x}+(g\hat{r}a)\hat{r}b)$. The device $g\hat{b}$ calculates $H (g\hat{x}+(g\hat{r}b)\hat{r}a)$. The values agree with K: $K=H(g\hat{x}+(g\hat{r}b)\hat{r}a)$.

(B7) Confirmation of key sharing: The device $g\hat{a}$ transmits Enc(K) ($g\hat{r}b$) to the device $g\hat{b}$. The device $g\hat{b}$ transmits Enc(K) ($g\hat{r}a$) to the device $g\hat{a}$. Enc(K) ($g\hat{r}b$) shows data obtained by encrypting $g\hat{i}b$ by the shared key K.

(B8) Confirmation of key sharing: The device $g\hat{a}$ decrypts Enc(K) ($g\hat{r}a$) received from the device $g\hat{b}$ by the shared key K, compares the obtained data with $g\hat{r}a$, and confirms whether or not the data agrees with $g\hat{r}a$. When they do not agree with each other, the process ends. The device $g\hat{b}$ also performs the same process.

Note that the above-described hash function is just one example, and other hash functions or a one-way function other than the hash function may be used. For example, the shared keys may be calculated using, for example, $H(g\hat{x} \times (g\hat{r}b)\hat{r}a)$.

Second Embodiment

In a second embodiment, an example of a key exchange protocol with a revoke function when two MKBs (MKB1, MKB2) are used will be explained.

Figure 5:
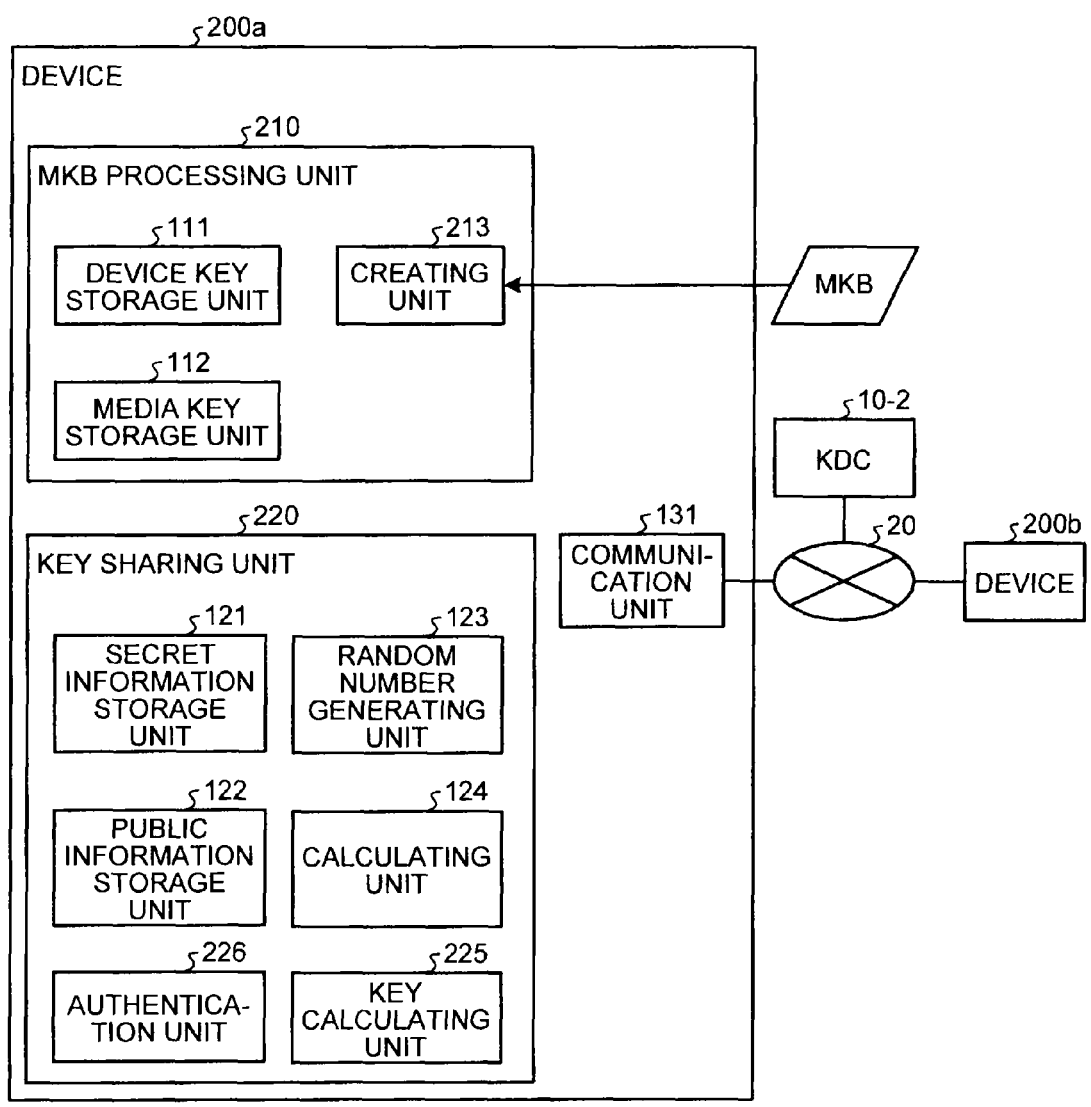
FIG. 5 is a block diagram of a system including an information processing apparatus of a second embodiment.

FIG. 5 is a block diagram illustrating an example of a configuration of a system including devices 200 according to the second embodiment. As illustrated in FIG. 5, the devices 200 include an MKB process unit 210, a key sharing unit 220, and a communication unit 131.

In the second embodiment, the functions of a KDC 10-2, a creating unit 213, a key calculating unit 225, and an authentication unit 226 are different from those of the first embodiment. Since the other configurations and functions are the same as FIG. 1 as the block diagram of the device 100 according to the first embodiment, the same reference numerals are applied and explanations thereof are omitted.

The KDC 10-2 issues P, a private ID, a sign (KS)((private ID)×P), a device key, a hash function H, and a hash function h to the respective devices. Here, (private ID)×P is identification information of the device (i.e. a public ID of the device). P is a base point on an elliptic curve.

The KDC 10-2 creates n pieces of device keys $\{k\_1, \ldots, k\_n\}$ and n pieces of media keys $\{s\_1, \ldots, s\_n\}$ in response to a revoked device. The KDC 10-2 calculates MKB1=$\{Enc(k\_1)(s\_1), \ldots, Enc(k\_n)(s\_n)\}$, and MKB2=$\{Enc(k\_1 \times P)(s\_1 \times P), \ldots, Enc(k\_n \times P)(s\_n \times P)\}$. The KDC 10-2 securely delivers the calculated MKB1 and MKB2 to the respective devices 200. Here, Enc(k\_i)(s\_i) represents data obtained by encrypting a certain media key s\_i by a corresponding device key k\_i.

When a secure communication path cannot be used, the MKB1 and MKB2 are delivered after they are applied with means for detecting that they are altered. For example, the respective devices 200 can detect that the MKB1 and the MKB2 are altered if the KDC 10-2 applies a digital signature to the MKB1 and the MKB2.

The creating unit 213 is different from the creating unit 113 of the first embodiment in that it creates media keys using the two MKBs (the MKB1 and the MKB2). The key calculating unit 225 is different from the key calculating unit 125 of the first embodiment in that it calculates a shared key using data calculated using the two MKBs.

Figure 6:
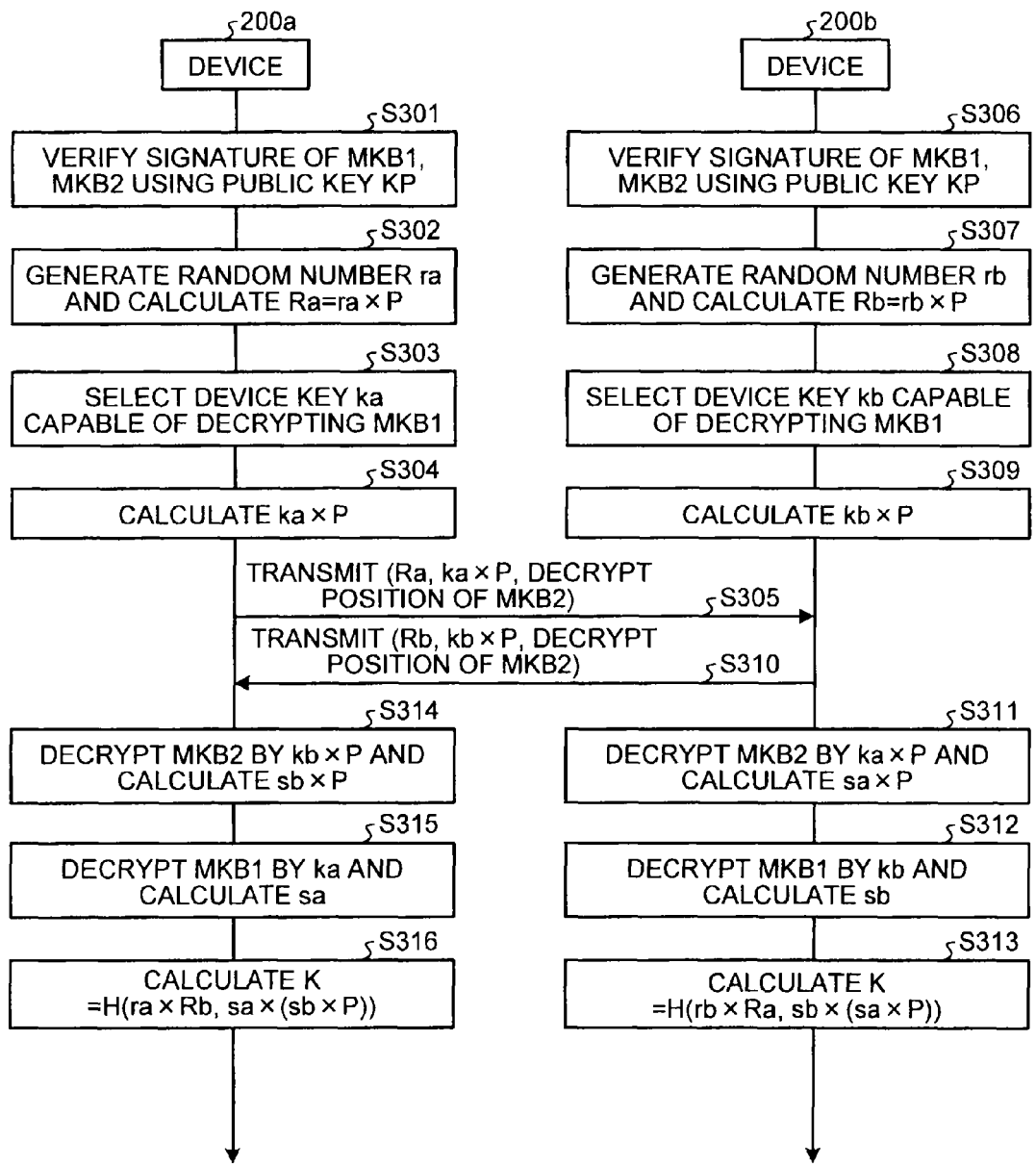
FIG. 6 is a sequence diagram of a key sharing process of the second embodiment.

Next, a key sharing process performed by the devices 200 according to the second embodiment configured as described above will be explained using FIG. 6. FIG. 6 is a sequence diagram illustrating an overall flow of the key sharing process in the second embodiment. Hereinafter, a case that shared keys shared between a device 200a (device a×P) and a device 200b (device b×P) are created will be explained as an example.

The MKB process unit 210 of the device a×P verifies the signatures of the MKB1 and the MKB2 using a public key KP (step S301). When the signature cannot be verified, the process ends.

The calculating unit 124 of the device a×P reads the base point from the public information storage unit 122, instructs the random number creating unit 123 to generate a random number, obtains generated ra, and calculates Ra=ra×P (step S302). The MKB process unit 210 of the device a×P selects a device key ka which can properly create the MKB1 (step S303). The MKB process unit 210 calculates ka×P (step S304). The values may be previously calculated before a communication to another device is tried.

The communication unit 131 of the device a×P transmits (Ra, ka×P, the process position of the MKB2 (the creation position of the media key)) to the device b×P (step S305). Also in the device b×P, the MKB process unit 210 verifies the signatures of the MKB1 and the MKB2 using a public key KP (step S306), and when the signature cannot be verified, the process ends.

When the calculating unit 124 of the device b×P receives (Ra, ka×P, the process position of the MKB2 (the creation position of the media key)), the calculating unit 124 obtains P and rb likewise the device a×P, and calculates Rb=rb×P (step S307). The MKB process unit 210 of the device b×P selects a device key kb which can properly process the MKB1 (step S308). The MKB process unit 210 calculates kb×P (step S309). The communication unit 131 of the device b×P transmits (Rb, kb×P, the process position of the MKB2 (the creation position of the media key)) to the device a×P (step S310).

The MKB process unit 210 of the device b×P processes the MKB2 using ka×P and obtains sa×P as a media key (step S311). The MKB process unit 210 of the device b×P processes the MKB1 using kb and obtains a media key sb (step S312). The key calculating unit 225 of the device b×P calculates K=H(rb×Ra,sb×(sa×P)) and uses it as a shared key (step S313). The device b×P stores (rb, Ra) in, for example, the secret information storage unit 121 for a mutual authentication process.

In contrast, when the MKB process unit 210 of the device a×P receives (Rb, kb×P, the process position of the MKB2 (the creation position of the media key)), the MKB process unit 210 processes the MKB2 using kb×P and obtains sb×P as a media key (step S314). The MKB process unit 210 of the device a×P processes the MKB1 using ka and obtains a media key sa (step S315). The key calculating unit 225 of the device a×P calculates K=H(ra×Rb,sa×(sb×P)) and uses it as a shared key (step S316). The device a×P stores (ra, Rb) in, for example, the secret information storage unit 121 for the mutual authentication process.

Since H(ra×Rb,sa×(sb×P))=H(rb×Ra,sb×(sa×P))=H((ra rb)×P,(sb sa)×P), keys can be properly shared.

Note that the above-described hash function is just one example, and other hash functions and a one-way function other than the hash function may be used. For example, the shared keys may be calculated using H(ra×Rb+sa×(sb×P)) and the like.

After the sharing process, a procedure for confirming that the shared keys K are shared may be performed likewise the first embodiment.

Figure 7:
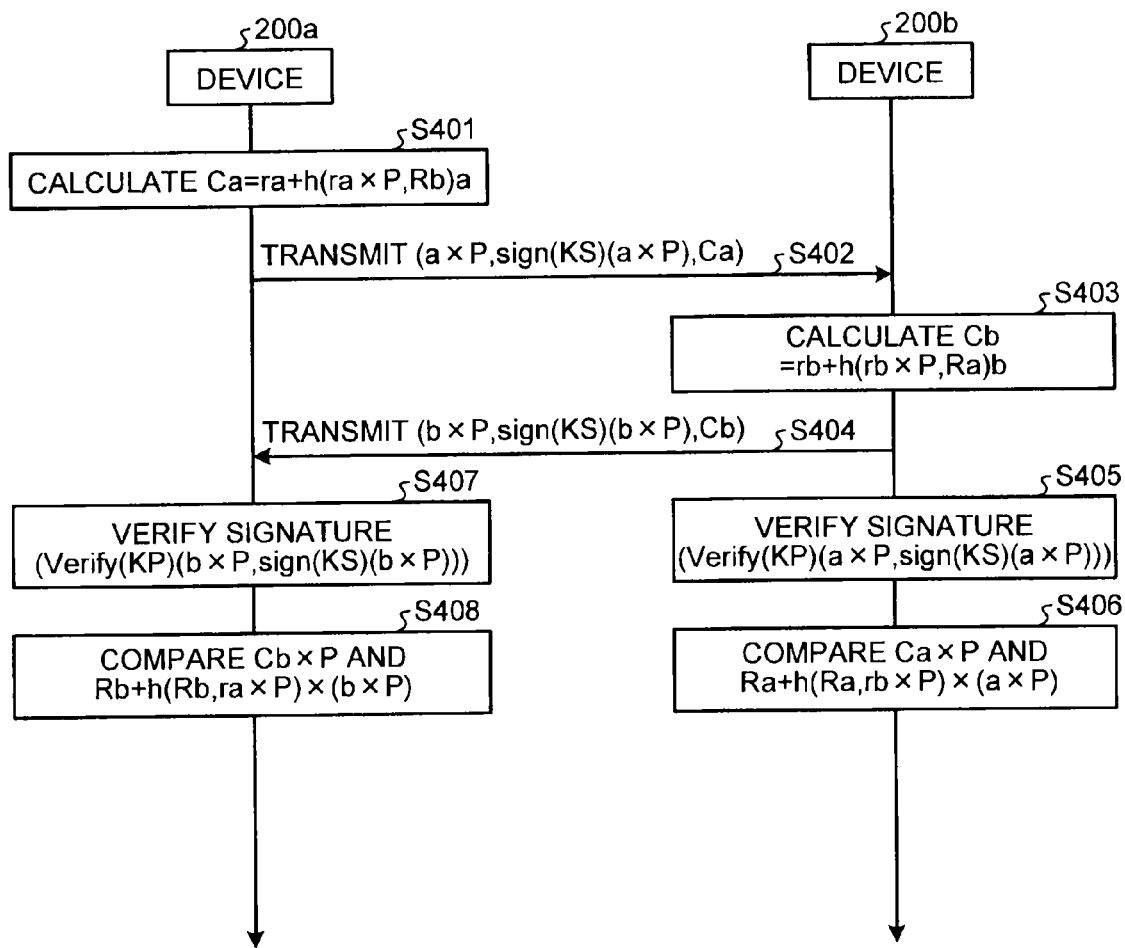
FIG. 7 a sequence diagram of a mutual authentication process of the second embodiment.

FIG. 7 is a sequence diagram illustrating an overall flow of the mutual authentication process in the second embodiment. Hereinafter, explanation will be made using the mutual authentication process between the device 200a (the device a×P) and the device 200b (the device b×P) as an example.

The authentication unit 226 of the device a×P reads (ra, Rb) stored therein and calculates Ca=ra+h(ra×P,Rb)a (step S401). The authentication unit 226 of the device a×P transmits (a×P,sign(KS)(a×P),Ca) to the device b×P (step S402).

When the authentication unit 226 of the device b×P receives (a×P,sign(KS)(a×P),Ca), the authentication unit 226 reads (rb, Ra) stored therein and calculates Cb=rb+h(rb×P,Ra)b (step S403). The authentication unit 226 of the device b×P transmits (b×P,sign(KS)(b×P),Cb) to the device a×P (step S404).

The authentication unit 226 of the device b×P verifies that Verify(KP)(a×P,sign(KS)(a×P))=1 is established (step S405). The authentication unit 226 of the device b×P checks whether Ca×P==Ra+h(Ra,rb×P)×(a×P) is established (step S406).

Here, Verify is a verification algorithm of a signature given from the KDC 10-2. When the check is passed (Verify=1), the authentication unit 226 of the device b×P admits that a communication partner is the device a×P whose identification information is a×P.

In contrast, when the authentication unit 226 of the device a×P receives (b×P,sign(KS)(b×P),Cb), the authentication unit 226 verifies that Verify(KP) (b×P,sign(KS)(b×P))=1 is established (step S407). Furthermore, the authentication unit 226 of the device a×P checks whether Cb×P==Rb+h(Rb,ra×P)×(b×P) is established (step S408). When the check is passed, the authentication unit 226 of the device a×P admits that a communication partner is the device b×P whose identification information is b×P.

Third Embodiment

In the third embodiment, a key exchange protocol with a revoke function is realized between many devices. Hereinafter, a case that shared keys are shared between five devices 300 (devices 300a, 300b, 300c, 300d, 300e) will be explained as an example.

Figure 8:
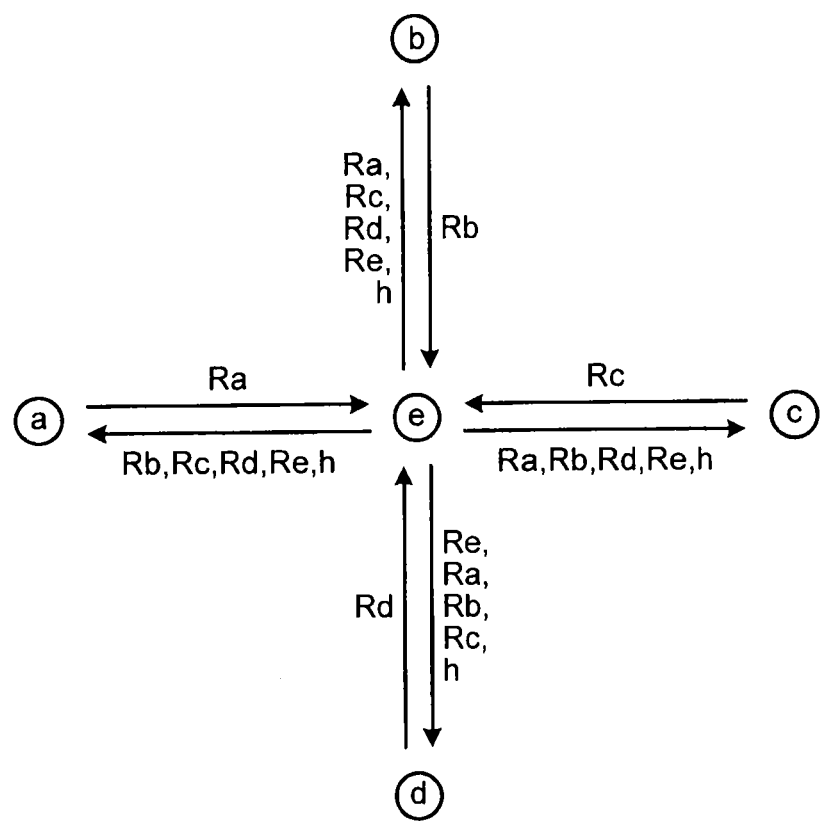
FIG. 8 is a diagram explaining a model in which plural information processing apparatuses share keys.

FIG. 8 is a diagram explaining a model in which the devices 300a, 300b, 300c, 300d, 300e share keys. In sharing keys, the devices 300, which desire the key sharing, previously perform a communication and select a device 300 which becomes a center of a key sharing protocol. FIG. 8 shows an example in which the device 300e is selected. Note that a, b, c, d, and e of FIG. 8 show the devices 300a, 300b, 300c, 300d, and 300e, respectively. Further, Ri (i is any of a, b, c, d, e) shows a value calculated by a device 300i using a random number and the like.

Figure 9:
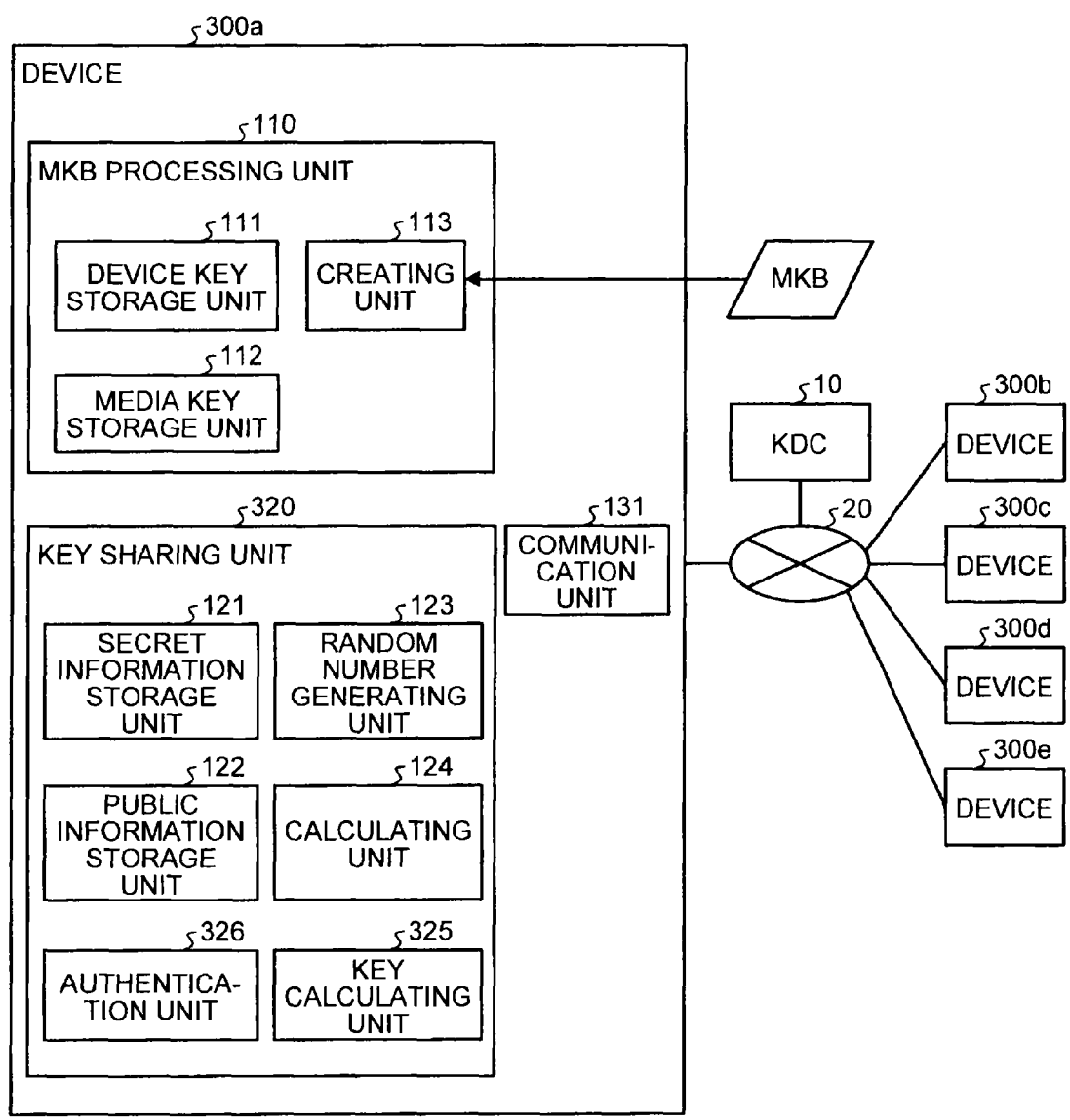
FIG. 9 is a block diagram of a system including an information processing apparatus of a third embodiment.

FIG. 9 is a block diagram illustrating an example of a configuration of a system including the devices 300 according to the third embodiment. As illustrated in FIG. 9, the devices 300 include an MKB processing unit 110, a key sharing unit 320, and a communication unit 131.

In third embodiment, the functions of a key calculating unit 325 and an authentication unit 326 are different from the first embodiment. Since the other configurations and functions are the same as FIG. 1 of the device 100 according to the first embodiment, the same reference numerals are applied and explanations thereof are omitted. The key calculating unit 325 is different from the key calculating unit 125 of the first embodiment in that the key calculating unit 325 calculates the shared keys K using the data received from other devices 300.

Figure 10:
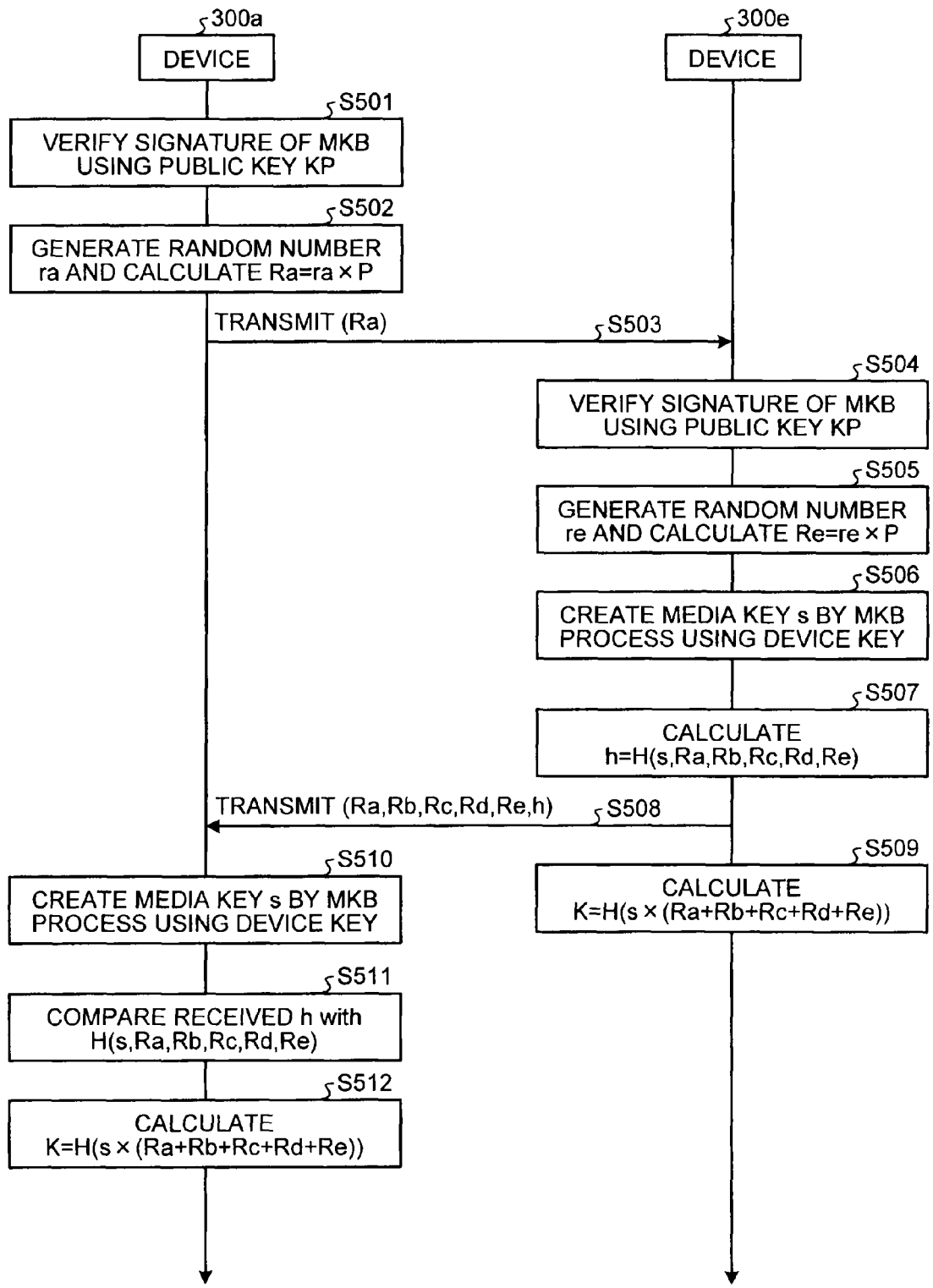
FIG. 10 is a sequence diagram of a key sharing process of the third embodiment.

Next, a key sharing process performed by the devices 300 according to the third embodiment configured as described above will be explained using FIG. 10. FIG. 10 is a sequence diagram illustrating an overall flow of the key sharing process in the third embodiment. Since the devices 300a-300d perform the same process, only a process performed particularly between the device 300a (device a×P) and the device 300e (device e×P) will be described here.

The MKB processing unit 110 of the device a×P verifies the signature of an MKB using a public key KP (step S501). When the signature cannot be verified, the process ends. The calculating unit 124 of the device a×P obtains a random number ra and calculates Ra=ra×P (step S502). The calculation may be previously performed before the device a×P tries to communicate with another device. The communication unit 131 of the device a×P transmits Ra to the device e×P (step S503).

In the device e×P, the MKB processing unit 110 verifies the signature of an MKB using a public key KP likewise (step S504), and when the signature cannot be verified, the process ends.

When the calculating unit 124 of the device e×P receives (Ra, Rb, Rc, Rd) from the devices a×P–d×P, the calculating unit 124 obtains a random number re likewise the device a×P and calculates Re=re×P (step S505). The creating unit 113 of the device e×P calculates a media key s using a device key which can properly process the MKB (step S506). The key calculating unit 325 of the device e×P calculates h=H(s, Ra, Rb, Rc, Rd, Re) (step S507). The communication unit 131 of the device e×P transmits (Ra, Rb, Rc, Rd, Re, h) to the devices a×P–d×P (step S508). The key calculating unit 325 of the device e×P calculates K=H(s×(Ra+Rb+Rc+Rd+Re)) and uses it as a shared key (step S509). The device e×P stores at least (re, Ra, Rb, Rc, Rd) in, for example, the secret information storage unit 121 for a mutual authentication process.

In contrast, upon receipt of (Ra, Rb, Rc, Rd, Re, h), the creating unit 113 of the device a×P processes the MKB by the device key and obtains the media key s (step S510). The key calculating unit 325 of the device a×P checks whether or not the received h=H(s, Ra, Rb, Rc, Rd, Re) is established (step S511). The key calculating unit 325 of the device a×P calculates K=H(s×(Ra+Rb+Rc+Rd+Re)) and uses it as the shared key (step S512). The device a×P stores at least (ra, Rb, Rc, Rd, Re) in, for example, the secret information storage unit 121 for the mutual authentication process.

Figure 11:
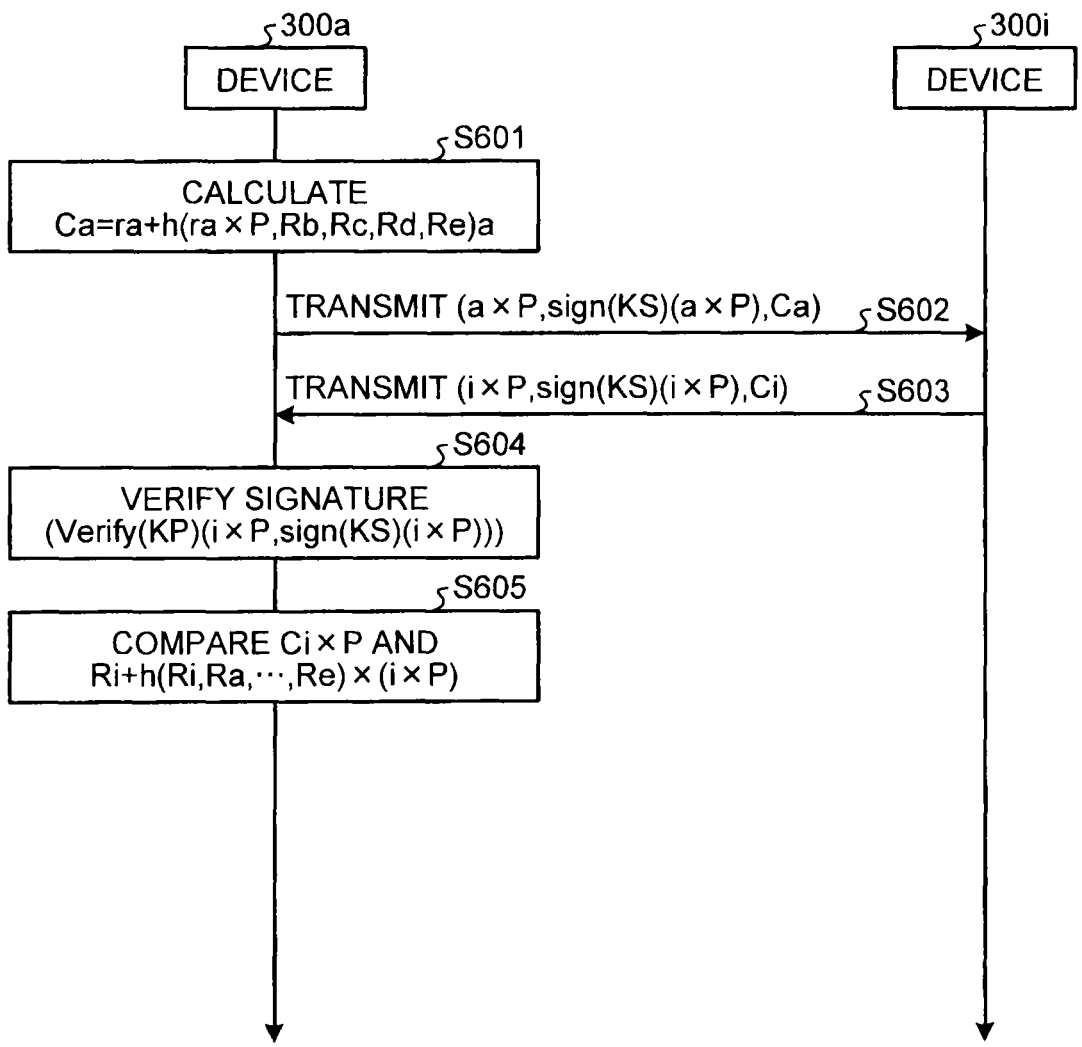
FIG. 11 is a sequence diagram of a mutual authentication process of the third embodiment.

FIG. 11 is a sequence diagram illustrating an overall flow of the mutual authentication process in the third embodiment. Since the processes of the respective devices 300 are the same, the mutual authentication process between the device 300a (device a×P) and a device 300i (i is b, c, d, e) (device i×P) will be explained below as an example.

The authentication unit 326 of the device a×P reads (ra, Rb, Rc, Rd, Re) stored therein and calculates Ca=ra+h(ra×P,Rb,Rc,Rd,Re)a (step S601). Then, the authentication unit 326 of the device a×P transmits (a×P,sign(KS)(a×P),Ca) to the device i×P (device b×P–device e×P) (step S602). Likewise, the authentication unit 326 of the device i×P transmits (i×P,sign(KS)(i×P),Ci) to the device a×P (step S603).

Upon receipt of (i×P,sign(KS)(i×P),Ci), the authentication unit 326 of the device a×P verifies that Verify(KP)(i×P,sign(KS)(i×P))=1 is established (step S604). The authentication unit 326 of the device a×P checks whether Ci×P==Ri+h(Ri, Ra, . . . , Re)×(i×P) is established (step S605). When the check is passed, the authentication unit 326 of the device a×P admits that a communication partner is the device i whose identification information is i×P.

Fourth Embodiment

An embodiment in which an information processing apparatus is applied to a smart grid will be explained. The smart grid is a next-generation power network which is constructed for the stabilization of power quality when recyclable energy such as solar power, wind power, and the like are also used in addition to conventional power generated using atomic power, thermal power, and the like.

Figure 12:
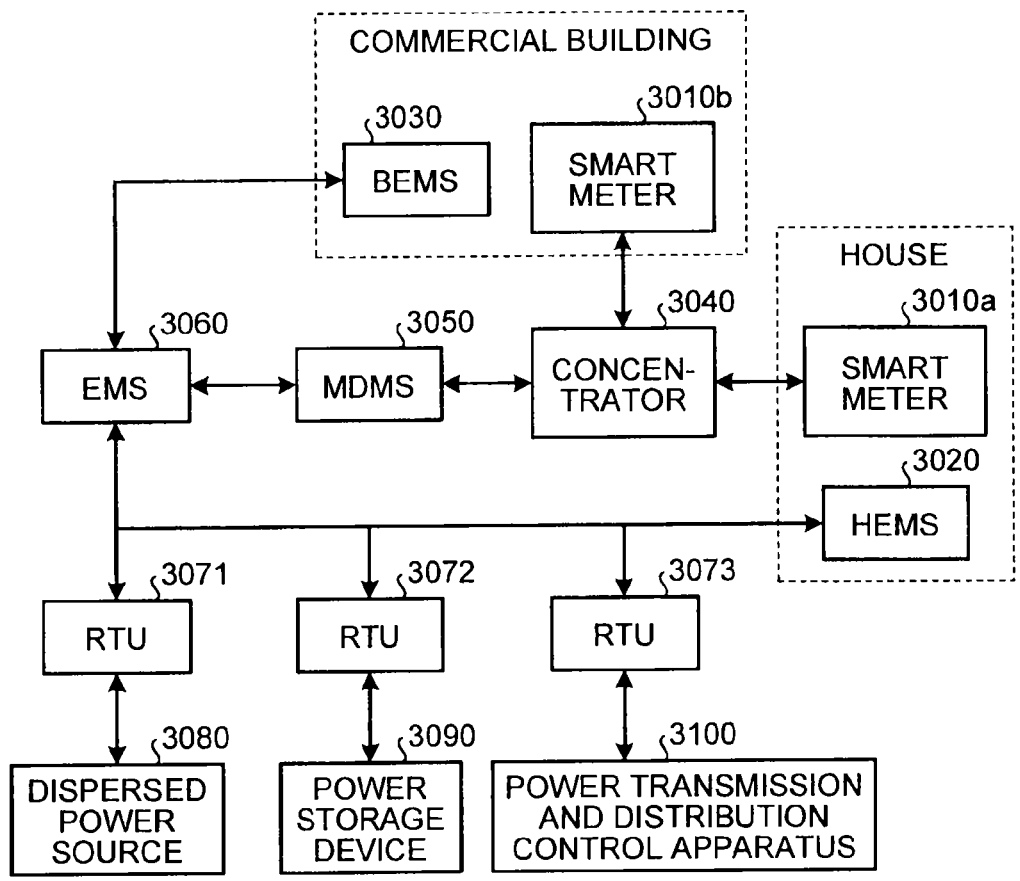
FIG. 12 is a diagram illustrating a configuration example of a next-generation power network of a fourth embodiment.

FIG. 12 is a diagram illustrating an example of a configuration of a next-generation power network of the fourth embodiment. In the next-generation power network, a smart meter 3010a for metering power consumption and an HEMS (Home Energy Management System) 3020 for managing home appliances are installed in respective houses. In commercial buildings, a BEMS (Building Energy Management System) 3030, which is a server for managing electric appliances in the buildings, is installed in the respective buildings. The commercial buildings are installed with a smart meter 3010b similar to the smart meter 3010a. Hereinafter, the smart meters 3010a and 3010b are simply called a smart meter 3010.

Each several sets of the smart meters 3010 are aggregated by a relay called a concentrator 3040 and communicate with an MDMS (Meter Data Management System) 3050, which is a meter data management system, via a communication network. The MDMS 3050 receives the amounts of power consumption from the smart meters 3010 of the respective houses at predetermined intervals and stores the amounts of power consumption. An EMS (Energy Management System) 3060 performs a power control such as requesting to suppress a power consumption to the smart meter 3010 and the HEMS 3020 of the respective houses on the basis of the amounts of power consumption of houses gathered to the MDMS 3050 and on the basis of information from a sensor installed to an electric power system. The EMS 3060 controls a power transmission and distribution control apparatus 3100, which controls power transmission between a dispersed power source 3080 such as solar power generation, wind force power generation, and the like connected to an RTU (Remote Terminal Unit) 3071, a power storage device 3090 connected to an RTU 3072 likewise, and a power generation side connected to an RTU 3073 and performs a control for stabilizing the voltage and the frequency of an overall grid.

A cipher communication is performed between the respective devices included in FIG. 12 using shared keys K. For example, the MDMS 3050 and the smart meter 3010 have the shared keys K, and perform the cipher communication using the shared keys K. The devices (device 100, device 200, device 300) of the respective embodiments can be applied to the devices used in the smart grid.

As explained above, according to the first to fourth embodiments, since the key sharing between the respective devices can be realized only by the distribution of the MKB from the KDC, an increase of burden on a key management can be avoided. Furthermore, revoking of a device can be easily realized.

Figure 13:
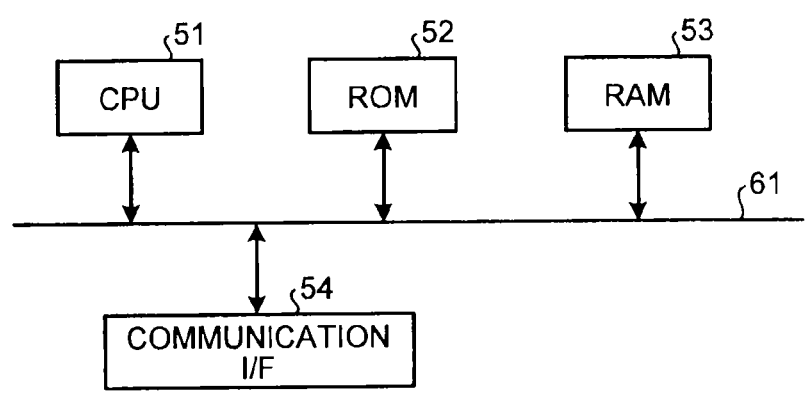
FIG. 13 is a hardware configuration diagram of information processing apparatuses of the first to fourth embodiments.

Next, a hardware configuration of the information processing apparatuses according to the first to fourth embodiments will be explained using FIG. 13. FIG. 13 is an explanatory diagram of the hardware configuration of the information processing apparatuses according to the first to fourth embodiments.

The information processing apparatuses according to the first to fourth embodiments include a control unit such as a CPU (Central Processing Unit) 51 and the like, a storage unit such as a ROM (Read Only Memory) 52, and a RAM (Random Access Memory) 53, and the like, a communication I/F 54 connected to a network for performing a communication, and a bus 61 for connecting the respective units.

A program performed by the information processing apparatuses according to the first to fourth embodiments is provided by being previously stored in the ROM 52 and the like.

The program, which is performed by the information processing apparatuses according to the first to fourth embodiments, may be configured such that the program is recorded in a computer-readable recording medium such as a CD-ROM (Compact Disk Read Only Memory), a flexible disc (FD), a CD-R (Compact Disk Recordable), a DVD (Digital Versatile Disk), and the like in a file of a type which can be installed or of a type which can be performed and is provided as a computer program product.

The program, which is performed by the information processing apparatuses according to the first to fourth embodiments, may be configured such that the program is stored on a computer connected to a network such as the Internet and the like and provided by being downloaded via the network. Furthermore, the progLam, which can be performed by the information processing apparatuses according to the first to fourth embodiments, may be configured such that the program is provided or distributed via the network such as the Internet and the like.

The program, which is performed by the information processing apparatuses according to the first to fourth embodiments can cause a computer to function as the respective units (MKB process unit, key sharing unit, communication unit) of the information processing apparatuses. The computer can read the program from a computer-readable recording medium onto a main storage device to be executed by the CPU 51

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus connected to an external apparatus, comprising:
    a device key memory that stores therein a device key; and
    a processing circuit that creates a media key from the device key and a media key block, calculates first output information based on first inherent information inherent to the information processing apparatus and public information, wherein the first inherent information is a value that is different from the media key and the media key block, transmits the first output information to the external apparatus and receives, from the external apparatus, second output information calculated by the external apparatus, and calculates a shared key shared between the information processing apparatus and the external apparatus based on the media key, the first inherent information, and the second output information, wherein the processing circuit performs a calculation for outputting the first output information from the first inherent information and the public information that is a prime number and an element of a p finite field, with which the first inherent information is intractable to find from the first output information using a discrete logarithm problem as a basis.

2. A computer program product having a non-transitory computer-readable medium including programmed instructions, wherein the instructions, when executed by a computer connected to an external apparatus and comprising a device key memory for storing a device key, cause the computer to perform:

creating a media key from the device key and a media key block;

calculating first output information based on first inherent information inherent to the computer and public information, wherein the first inherent information is a value that is different from the media key and the media key block; and transmitting the first output information to the external apparatus and receiving, from the external apparatus, second output information calculated by the external apparatus; and calculating a shared key shared between the computer and the external apparatus based on the media key, the first inherent information, and the second output information, wherein calculating the first output information is performed for outputting the first output information from the first inherent information and the public information that is a prime number and an element of a p finite field, with which the first inherent information is intractable to find from the first output information using a discrete logarithm problem as a basis.

3. An information processing method executed in an information processing apparatus that is connected to an external apparatus and includes a device key memory that stores therein a device key, the method comprising:

creating a media key from the device key and a media key block;

calculating first output information based on first inherent information inherent to the information processing apparatus and public information, wherein the first inherent information is a value that is different from the media key and the media key block;

transmitting the first output information to the external apparatus and receiving, from the external apparatus, second output information calculated by the external apparatus; and calculating a shared key shared between the information processing apparatus and the external apparatus based on the media key, the first inherent information, and the second output information, wherein calculating the first output information is performed for outputting the first output information from the first inherent information and the public information that is a prime number and an element of a p finite field, with which the first inherent information is intractable to find from the first output information using a discrete logarithm problem as a basis.

* * * * *